Patented Apr. 6, 1943

2,316,108

UNITED STATES PATENT OFFICE 2,316,108

ALKYLATION PROCESS AND CATALYST THEREFOR

Robert F. Ruthruff, Chicago, Ill.

No Drawing. Application March 17, 1941, Serial No. 383,803

18 Claims. (Cl. 196—10)

This invention relates to improved catalysts and processes for the alkylation of organic compounds. More specifically, this invention relates to improved catalysts and processes for the alkylation of organic compounds with olefines. More particularly, this invention relates to improved catalysts and processes for the alkylation of hydrocarbons by olefines.

The alkylation of organic compounds is a reaction well known in the art. For example, the formation of p-tertiary butyl phenol by the alkylation of phenol with tertiary butanol, tertiary butyl chloride, isobutylene, or similar reagents in the presence of suitable catalysts is well known in the art. Similarly, certain hydrocarbons, such as benzene, toluene, naphthalene and the like are easily alkylated with alkyl halides, alcohols, olefines, or similar reagents in the presence of suitable catalysts, the aluminum halides or concentrated sulfuric acid being commonly used for the purpose.

More recently it has been found that under certain conditions, paraffinic hydrocarbons may be directly alkylated with olefines. For example, in my United States application, Serial Number 739,281, filed August 10, 1934, which has since matured into United States Patent 2,082,518, issued June 1, 1937, it is shown that when propylene-propane mixtures are passed over mercuric aluminum bromide or antimonous aluminum bromide at 750 pounds per square inch pressure and temperatures of 100° to 200° F., the liquid polymer yield is appreciably larger than the amount of propylene disappearing. Similarly, Ipatieff and Groose (Journal of the American Chemical Society, volume 57, page 1616, 1935), showed that isoparaffins are alkylated with olefines in the presence of boron fluoride promoted with nickel powder and water (or hydrogen fluoride). Subsequently, Ipatieff, Grosse, Pines and Komarewsky (ibid. volume 58, page 913, 1936), showed that aluminum chloride is a more general catalyst, both normal and isoparaffins being alkylated with olefines in the presence of this agent. In this connection reference may be made to my United States application, Serial Number 32,379, filed July 20, 1935, which has since matured into United States Patent 2,172,146, issued September 5, 1939, wherein it is shown that normal paraffins, in the presence of aluminum chloride, form isoparaffins. This isomerization may well precede the alkylation noted by these investigators. Other investigators have found that the alkylation of paraffin hydrocarbons with olefines is catalyzed by such materials as lithium aluminum chloride, sodium aluminum chloride, and various aluminum halide-hydrocarbon complexes. More recently, it has been found that ordinary concentrated sulfuric acid is an excellent agent for catalyzing the alkylation of isoparaffins with olefines. For further information reference may be had to the article by Birch, Dunstan, Fidler, Pim and Tait in the Journal of the Institution of Petroleum Technologists, volume 24, page 303, 1938.

The alkylation of isoparaffins with olefines in the presence of concentrated sulfuric acid is now being practiced on the commercial scale. The utility of such a process is obvious. Previously, in the manufacture of high octane number gasoline, particularly high octane number gasoline for aviation purposes, it has been common practice to resort to catalytic polymerization of fractions containing hydrocarbons of four carbon atoms produced as a by-product in the cracking of petroleum fractions or by the catalytic dehydrogenation or thermal pyrolysis of the butane fraction from natural gas. Such fractions suitable for catalytic polymerization contain, in addition to isobutane and normal butane, isobutene, butene-1 and butene-2. During catalytic polymerization, the isobutene reacts rapidly, the normal butenes at a much slower rate, so that by proper control of conditions it is possible to obtain practically quantitative conversion of isobutene together with normal butene conversions varying from practically zero up to practically 100%. The resulting polymer consists largely of isomeric octenes and has an octane number of 80 to 82. This material is totally unsuited for use as an aviation fuel, due to the high unsaturate content, low octane number, and poor lead response. By hydrogenation, however, the isomeric octenes are converted to isomeric octanes. The hydrogenated product contains no unsaturates, has an octane number of from 90 to 98 or even higher, and exhibits an excellent lead response, and hence is well suited for use as an aviation fuel. The octane number of the hydrogenated product is largely a function of the amount of normal butenes converted; when normal butene conversion is low octane number is high and vice versa.

It will be obvious to those skilled in the art that alkylation offers many advantages over catalytic polymerization. By the alkylation of isobutane with a normal butene or isobutene, an isomeric octane is formed directly and accordingly the hydrogenation step, essential in the preparation of aviation fuels by catalytic polymerization, may be omitted. Furthermore, while in catalytic polymerization the maximum polymer yield can be no greater than the olefines present in the charge, in alkylation not only the olefines but also the isoparaffins react. Additionally, in alkylation there is no perceptible difference between isobutene and the normal butenes, the octane number of the alkylate being the same regardless of the olefine employed as the alkylation agent. Accordingly the total unsaturate content may be used. In catalytic polymerization, high octane number hydrogenated polymers are obtained only from isobutene polymers and from isobutene-normal butenes cross polymers. The normal butenes polymers have low octane numbers after hydrogenation. As a rule the butane fraction contains considerably more normal butenes than isobutene and as a result if a hydrogenated polymer of high octane number is desired, a considerable proportion of the normal butenes cannot be utilized.

The alkylation of isoparaffins by olefines in the presence of sulfuric acid is a very simple process. A mixture of the two reactants, with the isoparaffin preferably in large excess, is contacted under vigorous agitation with concentrated sulfuric acid at low temperatures and atmospheric or slightly elevated pressures. The reaction product is separated, the alkylate being sent to storage while the unreacted isoparaffins are mixed with fresh feed and recycled to the reaction zone. Ordinary room temperatures, or even lower temperatures, are commonly employed, for example, temperatures of 70° F. or below, such as 55° F., 35° F., 0° F., or even lower.

Theoretically, in the alkylation of isoparaffins with olefines, the sulfuric acid catalyst should remain unchanged indefinitely. Actually, however, the sulfuric acid, due to side reactions and to other causes, deteriorates more or less rapidly and must be replaced. In commercial operations it is common practice to withdraw acid from the alkylation reactor at a constant predetermined rate and replace that withdrawn with new acid at the same rate. The acid withdrawn has been found to contain water, sulfonic acids, sulfonates, and similar products, so that while fresh 98% sulfuric acid is charged to the reactor, that withdrawn may contain only 80 to 90% sulfuric acid and from 5 to 15%, more or less, of carbon. In the formation of traces of sulfonic acids, sulfonates and the like, traces of water are produced simultaneously, thereby diluting the acid. In addition, the feed commonly contains traces of water, which is also taken up by the acid. It has been found that for the alkylation reaction to proceed at a reasonable rate the acid concentration should preferably be 90% or more and in no case less than 80%. Accordingly, it is obvious that the alkylation acid must be restored to its initial strength from time to time by removal of the water formed in by-reactions and taken up from the feed. Also, it has been found that used alkylation acid, after being restored to 98% strength, for example by the addition of sulfur trioxide, is not nearly as effective in catalyzing the reaction as new 98% acid. In other words, the organic matter in used alkylation acid exhibits an inhibiting effect on the reaction so that to restore alkylation acid the organic matter as well as the water must be removed.

The amount of acid that must be continuously removed from the reactor and replaced by fresh in order to maintain a high catalyst efficiency varies with the reaction temperature. When alkylating at high temperatures, for example, 70° F. or more, it is preferable to remove 3 to 5 pounds or more of acid per gallon of alkylate formed. At lower temperatures, for example, 35° F. or below, the acid may be removed at a rate of about one pound per gallon of alkylate formed. While operating at low temperatures reduces appreciably the amount of acid that must be restored, even one pound of acid per gallon of alkylate is equivalent to over 50 tons of acid per day for a plant producing 2500 barrels of alkylate, so that acid restoration remains a real problem. In addition, when operating at low temperatures the rate of alkylation is low.

One object of this invention is to provide improved sulfuric acid catalysts for the alkylation of organic compounds. Furthermore, an object of this invention is to provide sulfuric acid catalysts for the alkylation of organic compounds, said catalysts exhibiting high activity at low temperatures. An additional object of this invention is to provide sulfuric acid catalysts for the alkylation of organic compounds, said catalysts being easily restored after partial or complete exhaustion. Other objects of this invention will become evident from the accompanying description.

In an attempt to increase the activity of sulfuric acid as a catalyst in the alkylation of isoparaffins with olefines, experiments were run in which the acid was promoted with small amounts of heavy metal salts and mixtures thereof, for example, salts of metals having an atomic number above 25 and a specific gravity of about 7.0 and mixtures of salts of such metals. Such promoted acids were more effective than the unpromoted acid in catalyzing the alkylation of isoparaffins with olefines, some of the promoted acids being appreciably more effective than others. The most effective heavy metal salts for promoting the sulfuric acid catalyst were salts of metals having a specific gravity above 7.0 and falling in the first, second and eighth groups of the periodic table, namely, salts of iron, cobalt, nickel, copper, zinc, ruthenium, rhodium, palladium, silver, cadmium, osmium, iridium, platinum, gold and mercury.

Obviously, a large number of metals in the above list can be eliminated from practical consideration because of excessive cost. On the basis of the two criteria, cost and effectiveness, salts of nickel, copper, silver and mercury appear to be the most suitable, although cadmium and zinc also have a high rating. Iron was found to be the least effective of the heavy metals listed.

When the concentrated sulfuric acid alkylation catalyst is promoted with a small amount of a heavy metal salt, or a mixture of heavy metal salts, particularly a small amount of a salt of nickel, copper, silver or mercury or a mixture of salts of these metals many benefits follow. In the first place, the rate of the alkylation reaction is appreciably increased thus permitting a desired daily production of alkylate to be made at a lower temperature than usual which in turn reduces acid consumption as has previously been pointed out. The increase in reaction rate is not at all surprising for in analytical chemistry it has long been known that the rate of olefine absorption from a gas sample can be increased by promoting the acid absorbent with a salt of copper, silver, mercury, nickel, etcetera or a mixture of salts of these metals. For further information on this point reference may be had to an article by Tropsch and Mattox, Industrial and Engineering Chemistry, analytical edition, volume 6, page 404, 1935. Probably as a corollary of the increased reaction rate previously mentioned, ethylene acts as an alkylating agent to a greater extent than in the presence of unpromoted acid. Additionally, the alkylation reaction is more clean cut in the presence of promoted acid in that polymerization of olefines is greatly curtailed, thus resulting in a more nearly saturated alkylate. Also, with unpromoted acid, a considerable part of the appreciable polymer production dissolves in the acid and thus contaminates it. As a possible corollary of the repression of polymerization, under otherwise similar conditions the yield of alkylate per pound of catalyst exhausted is much higher if a promoted catalyst is employed.

Further investigation has shown that the promoting activity of heavy metal salts or mixtures thereof can be enhanced by the addition of a selenium compound to the promoted acid. Furthermore, the presence of the selenium compound is of greatest value in the restoration of promoted alkylation acid when exhausted, this catalytic activity of the selenium compound in turn being enhanced by the heavy metal salt or salts.

Carbon compounds are removed from partially or completely exhausted unpromoted acid by a very complicated procedure. This involves the dilution of the partially or completely exhausted acid with water until the acid content is in the neighborhood of 50%, followed by cooking at temperatures somewhat above the normal boiling point of water, for example, 220 to 240° F., to hydrolyze and separate organic matter. By this process most of the organic matter forms a separate layer which can be skimmed from the dilute acid. Further reduction in carbon content can be accomplished by autoclaving the resulting partially purified acid at temperatures some 100° F. above those employed in the cooking process and again removing the organic layer. The resulting dilute acid is concentrated as usual to say 93% strength and is then fortified to 98% strength by the addition of sulfur trioxide or oleum.

In distinction to unpromoted sulfuric acid, it has been found that sulfuric acid, when promoted with a selenium compound and a small amount of a heavy metal salt or a mixture of heavy metal salts can, after partial or complete exhaustion be easily rendered carbon-free by simple heating. On heating, the carbon compounds in the doubly promoted acid are readily oxidized and eliminated as carbon dioxide, which is accompanied by sulfur dioxide. The resulting carbon free acid can then be fortified with sulfur trioxide or oleum and reused.

To further aid in the understanding of my invention, the following examples are given, but it is to be understood that these examples are illustrative only and in no way limit the scope of the invention.

Example 1

A mixture consisting of three volumes of isobutane and one volume isobutene was continuously passed with agitation through 98% sulfuric acid containing 0.10 to 0.15% by weight of selenium (added as selenious acid) and about 1.0% copper (added as copper oxide). The temperature was maintained at 30° F. After equilibrium had been established, acid was continuously withdrawn from the reactor at a rate of 0.8 pound per gallon of alkylate formed while restored 98% acid (from a source to be described hereinafter) was added to the reactor at the same rate. The acid withdrawn from the reactor was heated to a temperature in the neighborhood of 330° F. and was maintained at this temperature for 15 minutes, following which the remaining liquid was fortified with sufficient oleum to give one pound of 98% acid per pound of acid withdrawn from the reactor and the thus restored acid was returned to the reactor at the same rate as partially exhausted acid was withdrawn therefrom. The gases evolved during the heating of the acid withdrawn from the reactor were treated in a manner well known in the art to convert the sulfur dioxide component into sulfur trioxide and this in turn into oleum. It is obvious that by this method of operation the loss of copper and selenium is nil or practically so while the loss of sulfuric acid is extremely small.

Example 2

One volume of concentrated sulfuric acid saturated with nickel sulfate and 15 volumes of concentrated sulfuric acid containing 0.6% silver sulfate were mixed. About 0.1% selenium, based on the mixture, was added in the form of the dioxide. A gas stream consisting largely of isobutane was added to the trebly promoted acid at 35° F. followed by the slow addition of a gas mixture containing 35% butenes and 35% propene. Reaction occurred under violent agitation and slight pressure. The alkylate yield was 181% based on the olefines consumed. The alkylate was practically olefine free. The acid remaining at the end of this batch experiment was heated to 330° F. The small amount of carbon and carbonaceous materials therein was rapidly oxidized.

Example 3

Like Example 2, except that the catalyst mixture consisted of concentrated sulfuric acid saturated with nickel sulfate and containing 0.1% selenium (added as dioxide). Within the limit of experimental error the results could not be distinguished from those of Example 2 except that the rate of olefine reaction was slightly slower, estimated to be 10% slower.

Example 4

Like Example 2, except that the catalyst mixture consisted of concentrated sulfuric acid containing 0.6% silver sulfate and 0.1% selenium (added as dioxide). Within the limits of experimental error the results could not be distinguished from those obtained in Example 2.

Examples 5, 6, 7

Exactly like Examples 2, 3 and 4, except that the sulfuric acid also contained 1% mercury (added as oxide) in addition to the other promoters named. The alkylation reaction proceeded substantially as in Examples 2, 3, and 4 except that in some cases the reaction seemed to be slightly more rapid in the presence of the mercury compound. However, it was definitely determined that the restoration of the partially spent catalyst proceeded much more quickly in experiments in which the mercury compound was present.

As far as oxidation of carbon compounds is concerned, it is believed that the selenium compound acts as an oxygen carrier between the sulfuric acid and the carbon compound, perhaps in accordance with the following reactions:

$$H_2SO_4 + H_2SeO_3 = H_2O + SO_2 + H_2SeO_4 \quad (1)$$
$$2H_2SeO_4 + C = CO_2 + 2H_2SeO_3 \quad (2)$$

The presence of mercuric sulfate evidently promotes reaction (1). In its absence, no selenic acid can be detected in the reaction mixture while in its presence no selenious acid can be found, indicating that in the presence of mercuric sulfate, Reaction 1 proceeds instantaneously and completely in the direction shown. It is obvious that these speculations are theory only and in no way limit the scope of the instant invention.

In the above examples the amounts of selenium and heavy metal given are indicative only but represent satisfactory proportions to employ under average conditions. It should be understood that greater or lesser amounts may be employed as conditions dictate without departing from the spirit or scope of this invention. Since most heavy metal salts are but sparingly soluble in concentrated sulfuric acid, saturated solutions thereof with an excess of the salt in suspension may be employed if desired.

As will be evident to those skilled in the art, the exact form in which selenium and heavy metal are added to the acid is a matter of no great moment. They may be added as the elements, as a compound in the lower state of oxidation or as compound in the higher state of oxidation, assuming that two or more states of oxidation exist of course, for regardless of the form added, the agent will rapidly achieve the proper state of oxidation. Metallic selenium, for example, apparently is peptized by sulfuric acid, giving a green colloidal solution which slowly becomes colorless (rapidly on heating) with the formation of selenious acid. In the presence of certain metal salts, particularly salts of mercury, this selenious acid becomes selenic acid when the mixture is heated. With respect to heavy metal salts, if these themselves are employed in making the catalyst, the exact nature of the anion appears to be of no moment but for obvious reasons the use of the sulfate is logical, albeit not necessary. Heavy metal selenites or selenates may be used to promote sulfuric acid for the purposes of this invention, for example, natural selenites of copper, cobalt and lead, artificial heavy metal selenites and selenates as well as double selenites and selenates such as $Na_2Hg(SeO_3)_2$ and the like.

While the present invention has been described largely in connection with the alkylation of isoparaffins with olefines, it is obvious that the invention is of much wider scope, being applicable to practically any alkylation reaction wherein an organic compound is alkylated with an olefine or a material behaving as an olefine, in the presence of concentrated sulfuric acid. For example, the teachings of this invention may be applied with success to the alkylation of cyclic hydrocarbons, such as benzene, toluene, cyclohexane, naphthalene and the like, with olefines in the presence of concentrated sulfuric acid. Also, this invention has been applied with success to the alkylation of phenol with isobutylene or tertiary butyl chloride in the presence of concentrated sulfuric acid. When an attempt is made to alkylate organic materials with alcohols, ethers and the like in accord with the teachings of this invention, no great advantages in acid restoration result, for in such cases the elimination of water in the reaction destroys the activity of the acid before any appreciable amount of organic contamination of the acid is observed. However, in such reactions the alkylation itself is promoted.

The teachings of this invention have also been applied to reactions which are not truly alkylation, for example, to the conversion of olefines to alcohols. In this process, olefines are reacted with sulfuric acid to form alkyl sulfates, the reaction mixture is diluted with water, the alkyl sulfates are hydrolyzed to alcohols and separated from the dilute acid which is then concentrated. In this reaction the heavy metal salts or mixtures thereof plus selenium accelerate olefine absorption, while during reconcentration of the acid the combined action of the heavy metal salt or mixtures thereof and selenium present accelerates the destruction or organic by-products by oxidation.

This application is in part a continuation of my co-pending application, Serial Number 307,448, filed December 4, 1939 Patent No. 2,295,608, issued September 15, 1942.

While the present invention has been described in connection with details or specific examples thereof, it is not intended that these shall be regarded as limitations upon the scope of this invention except insofar as included in the accompanying claims.

I claim:

1. In the alkylation of isoparaffins with olefines, the improvement comprising employing a concentrated sulfuric acid catalyst containing a selenium compound and a nickel compound.

2. In the alkylation of isoparaffins with olefines, the improvement comprising employing a concentrated sulfuric acid catalyst containing a selenium compound and a copper compound.

3. In the alkylation of isoparaffins with olefines, the improvement comprising employing a concentrated sulfuric acid catalyst containing a selenium compound and a silver compound.

4. In the alkylation of isoparaffins with olefines, the improvement comprising employing a concentrated sulfuric acid catalyst containing a selenium compound, a mercury compound and a nickel compound.

5. In the alkylation of isoparaffins with olefines, the improvement comprising employing a concentrated sulfuric acid catalyst containing a selenium compound, a mercury compound and a copper compound.

6. In the alkylation of isoparaffins with olefines, the improvement comprising employing a concentrated sulfuric acid catalyst containing a selenium compound, a mercury compound and a silver compound.

7. An alkylation catalyst which comprises concentrated sulfuric acid containing a selenium compound and a nickel compound.

8. An alkylation catalyst which comprises concentrated sulfuric acid containing a selenium compound and a copper compound.

9. An alkylation catalyst which comprises concentrated sulfuric acid containing a selenium compound and a silver compound.

10. An alkylation catalyst which comprises concentrated sulfuric acid containing a selenium compound, a mercury compound and a nickel compound.

11. An alkylation catalyst which comprises concentrated sulfuric acid containing a selenium compound, a mercury compound and a copper compound.

12. An alkylation catalyst which comprises concentrated sulfuric acid containing a selenium compound, a mercury compound and a silver compound.

13. In the alkylation of organic compounds, the improvement comprising employing a concentrated sulfuric acid catalyst containing a selenium compound and a compound of at least one metal selected from the group consisting of nickel, silver and copper.

14. In the alkylation of organic compounds, the improvement comprising employing a concentrated sulfuric acid catalyst containing a selenium compound, a mercury compound and a compound of at least one metal selected from the group consisting of nickel, silver and copper.

15. In the alkylation of isoparaffins with olefines, the improvement comprising employing a concentrated sulfuric acid catalyst containing a selenium compound and a compound of at least one metal selected from the group consisting of nickel, silver and copper.

16. In the alkylation of isoparaffins with olefines, the improvement comprising employing a concentrated sulfuric acid catalyst containing a selenium compound, a mercury compound and a compound of at least one metal selected from the group consisting of nickel, silver and copper.

17. An alkylation catalyst which comprises concentrated sulfuric acid containing a selenium compound and a compound of at least one metal selected from the group consisting of nickel, silver and copper.

18. An alkylation catalyst which comprises concentrated sulfuric acid containing a selenium compound, a mercury compound and a compound of at least one metal selected from the group consisting of nickel, silver and copper.

ROBERT F. RUTHRUFF.